(12) United States Patent
Landphair et al.

(10) Patent No.: US 7,647,875 B2
(45) Date of Patent: Jan. 19, 2010

(54) SEED HOPPER AND ROUTING STRUCTURE FOR VARYING MATERIAL DELIVERY TO ROW UNITS

(75) Inventors: Donald Keith Landphair, Bettendorf, IA (US); Christopher Allen Myers, Rock Island, IL (US); Patrick Eugene Pinkston, Milan, IL (US); Richard Hugo Clark, Geneseo, IL (US); Chris Warren Foster, Bettendorf, IA (US); Chad Erik Braden, Bettendorf, IA (US); Robert Wallace Martin, Parkview, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/178,982

(22) Filed: Jul. 24, 2008

(65) Prior Publication Data
US 2008/0282951 A1 Nov. 20, 2008

Related U.S. Application Data (62) Division of application No. 11/116,716, filed on Apr. 28, 2005, now Pat. No. 7,418,908.

(51) Int. Cl.
*A01C 7/00* (2006.01)
*A01C 9/00* (2006.01)

(52) U.S. Cl. .................................... 111/172; 111/186

(58) Field of Classification Search ......... 111/118–129, 111/7.1–7.4, 24, 63–67, 74, 75, 170–188, 111/90, 925
See application file for complete search history.

(56) References Cited

U.S. PATENT DOCUMENTS

| | | | |
|---|---|---|---|
| 4,193,356 A * | 3/1980 | Vehe et al. .................. 111/118 |
| 4,562,968 A | 1/1986 | Widmer et al. |
| 4,872,785 A | 10/1989 | Schrage et al. |
| 5,156,102 A | 10/1992 | Andersen |
| 5,161,473 A | 11/1992 | Landphair et al. |
| 5,392,722 A | 2/1995 | Snipes et al. |
| 5,467,751 A * | 11/1995 | Kumagai ..................... 123/399 |
| 5,598,794 A | 2/1997 | Harms et al. |
| 5,740,746 A | 4/1998 | Ledermann et al. |
| 5,915,313 A | 6/1999 | Bender et al. |
| 6,047,652 A | 4/2000 | Prairie et al. |
| 6,182,699 B1 | 2/2001 | Hawkes |
| 6,298,797 B1 | 10/2001 | Mayerle et al. |
| 6,510,367 B1 | 1/2003 | McQuinn |
| 6,527,205 B2 * | 3/2003 | Andersson et al. .......... 239/656 |
| 6,595,148 B2 | 7/2003 | Meyer et al. |
| 6,609,468 B1 | 8/2003 | Meyer et al. |

(Continued)

*Primary Examiner*—Christopher J. Novosad (57) ABSTRACT

Left and right main hoppers offset laterally from each other on opposite sides of the centerline of a seeding machine provide an operator access area between the hoppers. A third hopper located forwardly of and between the two main hoppers has a capacity less than that of each of the main hoppers for refuge or male seed. The hoppers are sized to maximize productivity. In one embodiment, first and second hoppers communicate with downstream conduit structure, and valve structure selects one or the other of the first and second hoppers for delivery of the material. The valve structure can be operated remotely and can be map based. Alternatively, selectively blockable nozzle structure is located in the first and second hoppers. Easily changeable connector structure facilitates row pattern selection and hose routing.

8 Claims, 8 Drawing Sheets

U.S. PATENT DOCUMENTS

| | | |
|---|---|---|
| 6,644,225 B2 | 11/2003 | Keaton |
| 6,688,244 B1 | 2/2004 | Meyer et al. |
| 6,708,631 B1 | 3/2004 | McQuinn et al. |
| 6,779,469 B1 | 8/2004 | Weaver |
| 6,845,724 B2 | 1/2005 | Mayerle et al. |
| 2001/0019087 A1 | 9/2001 | Andersonn et al. |
| 2003/0164126 A1 | 9/2003 | Paluch et al. |

* cited by examiner

SEED HOPPER AND ROUTING STRUCTURE FOR VARYING MATERIAL DELIVERY TO ROW UNITS

This application is a divisional application of Ser. No. 11/116,716 filed 28 Apr. 2005, now U.S. Pat. No. 7,418,908.

FIELD OF THE INVENTION

This document (including all drawings) claims priority based on U.S. application Ser. No. 11/116,716, filed Apr. 28, 2005, and entitled, SEED HOPPER AND ROUTING STRUCTURE FOR VARYING MATERIAL DELIVERY TO ROW UNITS under 35 U.S.C. 119(e).

The present invention relates generally to agricultural seeding implements and, more specifically, to structure for dispensing different types of seed and the like to planter or seeding row units.

BACKGROUND OF THE INVENTION

Numerous seeding implements are available for delivering seed from one or more central hoppers to individual row units. The individual row units may include a small hopper for automatic seed on demand refilling. When planting seed, certain agronomic benefits are available by changing seed varieties for a given row. For example, when planting seed corn the ability to easily select and change the pattern of rows for the male and female varieties can be highly advantageous. Many currently available bulk seed hopper systems are not readily compatible with planting practices utilizing two or more different seed hybrids.

Variety selection for the rows of a seeding implement is also advantageous for operations utilizing genetically modified seed. Planting of a refuge seed is often required when planting the genetically modified seed. A percentage of non-transgenic seed is typically planted with an insect transgenic seed to delay onset of resistance development. Regulatory agencies such as the USDA and EPA prefer the refuge crop be planted with a non-transgenic crop as a block separate and apart from the recombinant crops. Operators are required to purchase the regulatory amount of non-recombinant seed required for refuge along with any recombinant seed purchase. The percentage of refuge crop planted can vary from a small amount up to 20% or more of the total crop, depending on the type of crop plant subject to regulatory requirements and the amount of insect pressure expected for a particular geographic location. Although refuge for insect resistant hybrids can be planted adjacent the resistant crop or even in an adjacent field, effectiveness of the refuge increases if the refuge is planted in strips in the same field as the insect resistant variety.

In some fields, it may be desirable to vary the row location and/or percentage of refuge crop or other variety planted from one area to another. When a circle irrigated field is planted, for example, varying seed varieties can improve drought resistance for non-irrigated regions. Also, ability to change seed varieties within a field to improve pest or mold resistance can be highly advantageous. Changing varieties on the go or with little downtime has been difficult or impossible with many currently available seeding implements such as those with seed on demand delivery systems. As map-based farming practices become increasingly popular, the need for improved variety control for such delivery systems becomes more evident.

If the crop harvested from the genetically modified seed is to be separated from the crop harvested from the refuge seed, a different row pattern may need to be employed to accommodate harvester header configuration than if the crops are not to be segregated at harvest. Some farmers leave one unplanted row of crop approximately every sixty feet or other desired spacing to act as a row marker for spraying. The set-up of the planter or seeding implement for proper variety control, refuge percentage control, row spacing, marker row spacing and/or male-female seed row configuration can be very time-consuming. To achieve various row patterns, delivery lines to certain row units must be blocked or rerouted. Placement of hoppers for conveniently loading two or more materials while maintaining acceptable load distribution on the seeding implement with fully loaded hoppers is also a continuing source of difficulty. Loading of some of the seed varieties by hand from bags while bulk loading other varieties is not uncommon. Therefore, convenient access must be provided for both bulk filling and manual filling. It is also desirable to maximize use of individual hopper capacity to lessen the number of hopper reloading operations required.

SUMMARY OF THE INVENTION

It is therefore an object of the present invention to provide an improved seed hopper and routing structure for a seeding implement. It is another object to provide such a structure which overcomes most or all of the aforementioned problems.

It is a further object of the present invention to provide hopper and routing structure for a seeding implement providing advantages of bulk seed hoppers with versatility of planting two or more seed hybrids. It is another object to provide such structure which facilitates rerouting or blocking of material delivery to row units to most efficiently utilize hopper capacity, optimize control of seed variety, refuge percentage and location, and row spacing for different seeding materials and field conditions. It is another object to provide such a structure wherein seed varieties and seed routing can be changed quickly or, if desired, on the go.

It is still another object to provide hopper structure accommodating up to three different seeding materials and having better access and weight distribution characteristics than many previously available hopper structures. It is another object to provide hose structure for use with the hopper structure to facilitate changes in seed hose routing and optimize use of hopper capacity.

A seeding implement includes a transversely extending main frame with left and right main hoppers offset laterally from each other on opposite sides of the centerline of the machine to provide an operator access area between the hoppers. A third hopper is located forwardly of and between the two main hoppers and has a capacity less than that of each of the main hoppers. The third hopper is conveniently located adjacent the forward end of the operator accesses area and is ideal for refuge or male seed, or the like. The hoppers are sized to maximize productivity and are particularly useful for planting male-female seed corn or providing a desired pattern of refuge crop. For example, a 20-30-50% tank capacity or similar combination fits seed corn planting requirements since most popular seed corn planting configurations are 20% male rows and 80% female rows. In addition, the system also matches typical refuge planting requirements of 20%.

In an embodiment of the invention, first and second hoppers, each hopper containing material to be delivered to the soil, communicate with downstream conduit structure extending towards the distributing unit and with a source of air upstream of the hoppers. Valve structure selects one or the other of the first and second hoppers for delivery of the material. In one configuration, a directional control air valve is connected upstream of the first and second hoppers and is controlled to deliver material pickup air to a nozzle in the selected one of the hoppers. In a second configuration, the valve structure includes an air and seed valve connected to the conduit structure downstream of the first and second hoppers to allow material from the selected hopper to flow while blocking material from the non-selected hopper. A third configuration includes selectively blockable nozzle structure located in the first and second hoppers, the nozzle structure facilitating pickup of material from the hoppers when unblocked and preventing pickup of material when blocked. A simple clip may be placed over the nozzle for blocking flow.

Easily changeable hose routing structure optimizes hose routing and provides desired row patterns and selectable hopper and row blocking. In an embodiment shown, a connector includes a selectively attachable cap preventing material flow through one or more of the conduits. The connectors comprises first and second mating portions for easy interchangeability. A cap is connectible in series between the portions to block material when flow from a particular hopper or to a particular row is to be discontinued. For dividing flow from one conduit or combining flow from two conduits into one, a Y-shaped connector is provided having first and second branches, each connectible to a selected one of the conduits. Cap structure is connectible in series between a branch and the associated conduit for selectively blocking flow when necessary for the desired row pattern.

These and other objects, features and advantages of the present invention will become apparent to one skilled in the art from the description below taken in view of the drawings.

DESCRIPTION OF THE PREFERRED EMBODIMENT

Figure 1:
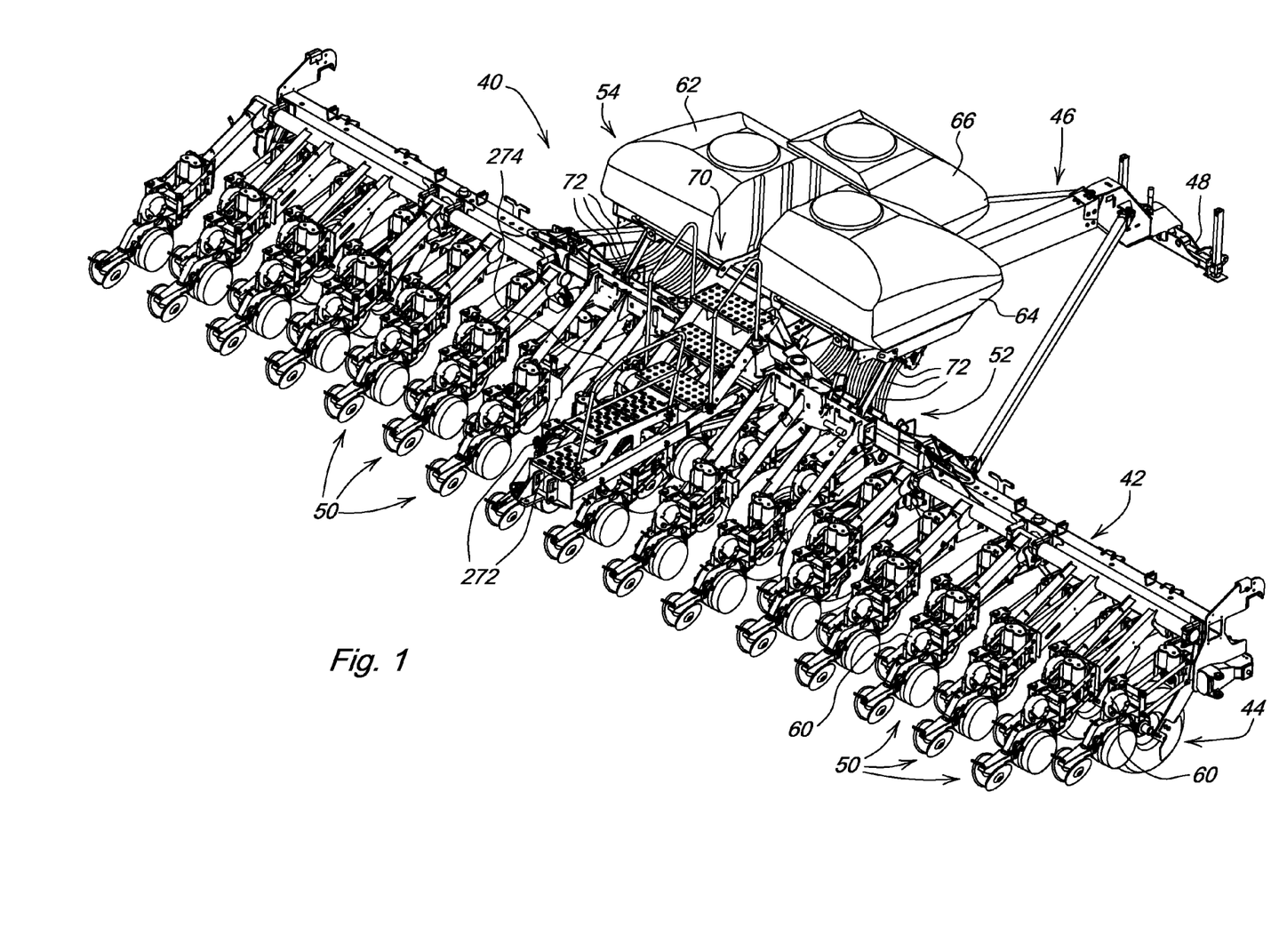
FIG. 1 is a perspective view of a seeding implement with seed hopper and routing structure.

Referring now to FIG. 1, therein is shown a seeding implement 40 including a transversely extending main frame 42 supported for forward movement over the ground by lift wheel assemblies 44. A hitch 46 projects forwardly from the main frame 42 generally along a fore-and-aft machine centerline and includes a hitch connection 48 adapted for connection to a tractor or other towing vehicle (not shown). The frame 42 supports a plurality of transversely spaced row units or tools 50 connected through conduit structure 52 hopper structure 54 supported adjacent the hitch 46. One or more materials such as seed is delivered through the conduit structure 52 from the hopper structure 54 to the row units 50 for delivery to the soil. The row units 50 include meter housings or mini-hoppers 60 for receiving seed from the conduit structure 52. A seed on demand or similar system may be used to maintain the desired level of seed in the housings or hoppers 60.

The hopper structure 54 includes left and right hoppers 62 and 64 offset laterally from each other on opposite sides of the machine centerline and a central hopper 66 located between and forwardly of the left and right hoppers 62 and 64 over the hitch 46. An operator accesses area 70 is defined between hoppers 62 and 64 rearwardly adjacent the hopper 66. As shown, the central hopper 66 typically serves as a refuge or male seed hopper and has a capacity substantially less than the capacity of the hoppers 62 and 64. The percentage of total system hopper capacity of the hopper 66 is equal to or approximates the percentage of refuge or male seed planted in a seeding operation. For example, for planting a 20% refuge or male seed, the ideal capacity of the hopper 66 will be approximately 20% of the total hopper system capacity.

Figure 3:
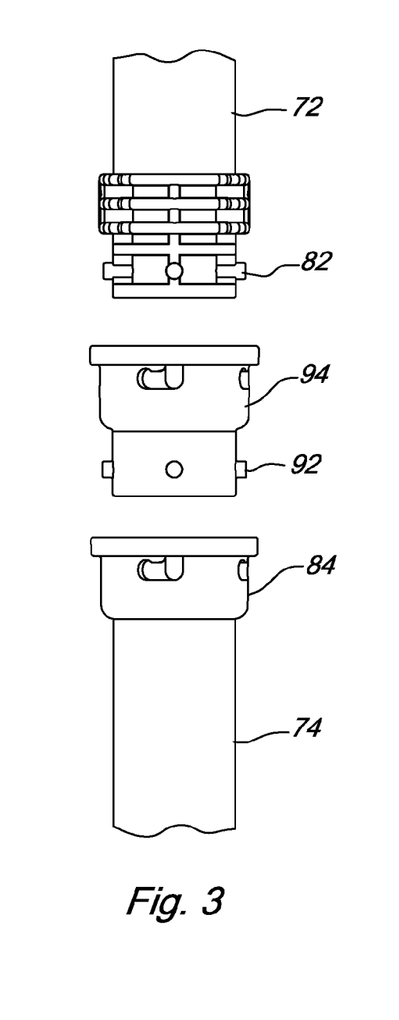
FIG. 3 is a plan view of a hose coupler and associated hose cap shown in a disassembled condition.
Figure 4:
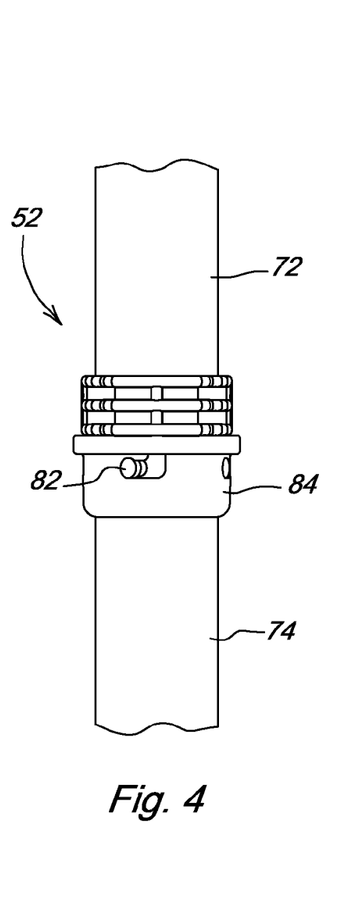
FIG. 4 is a view of the hose coupler of FIG. 3 shown without the cap and connected for transferring seed or other material.
Figure 5:
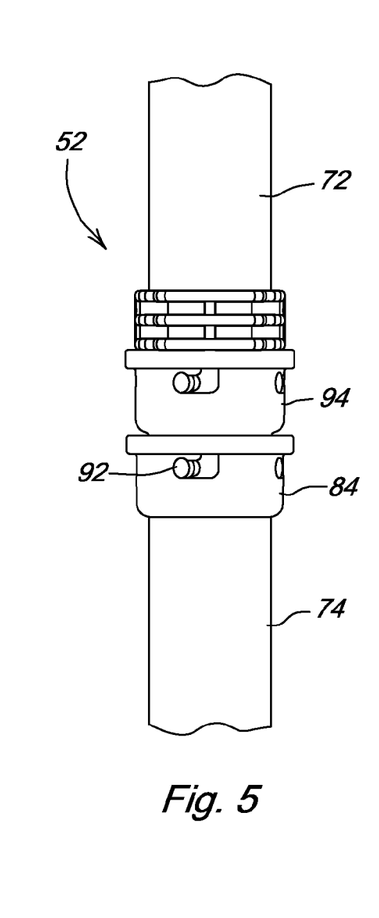
FIG. 5 is a view of the hose coupler of FIG. 3 with the cap connected to block material flow.

The conduit structure 52 communicates with the hopper structure 54 and includes individual conduit sections 72 and 74 selectively attachable to interconnect the hoppers 62, 64 and 66 to predetermined row units 50 for the desired delivery pattern. As best seen in FIGS. 3, 4 and 5, each conduit section 72 includes a male portion 82 of a bayonet connection, and the section 74 includes a female portion 84 for receiving the portion 82. Identical bayonet portions 82 and 84 may be used for a number or all of the sections 72 and 74 to provide interchangeable connections for a large variety of possible combinations of hose routing connections.

A conduit blocking cap 90 includes a male bayonet portion 92 for receipt by the portion 84 on the section 74. An opposite female bayonet portion 94 receives the male portion 82 of the conduit section 72. When connected as shown in FIG. 5, the cap 90 seals and block flow through the connector ends of both the sections 72 and 74 and provides mutual support of the ends. Alternatively, the cap 90 may be used to block one of the sections 72 and 74 with the remaining section removed, rerouted or stored in a different location.

Figure 6:
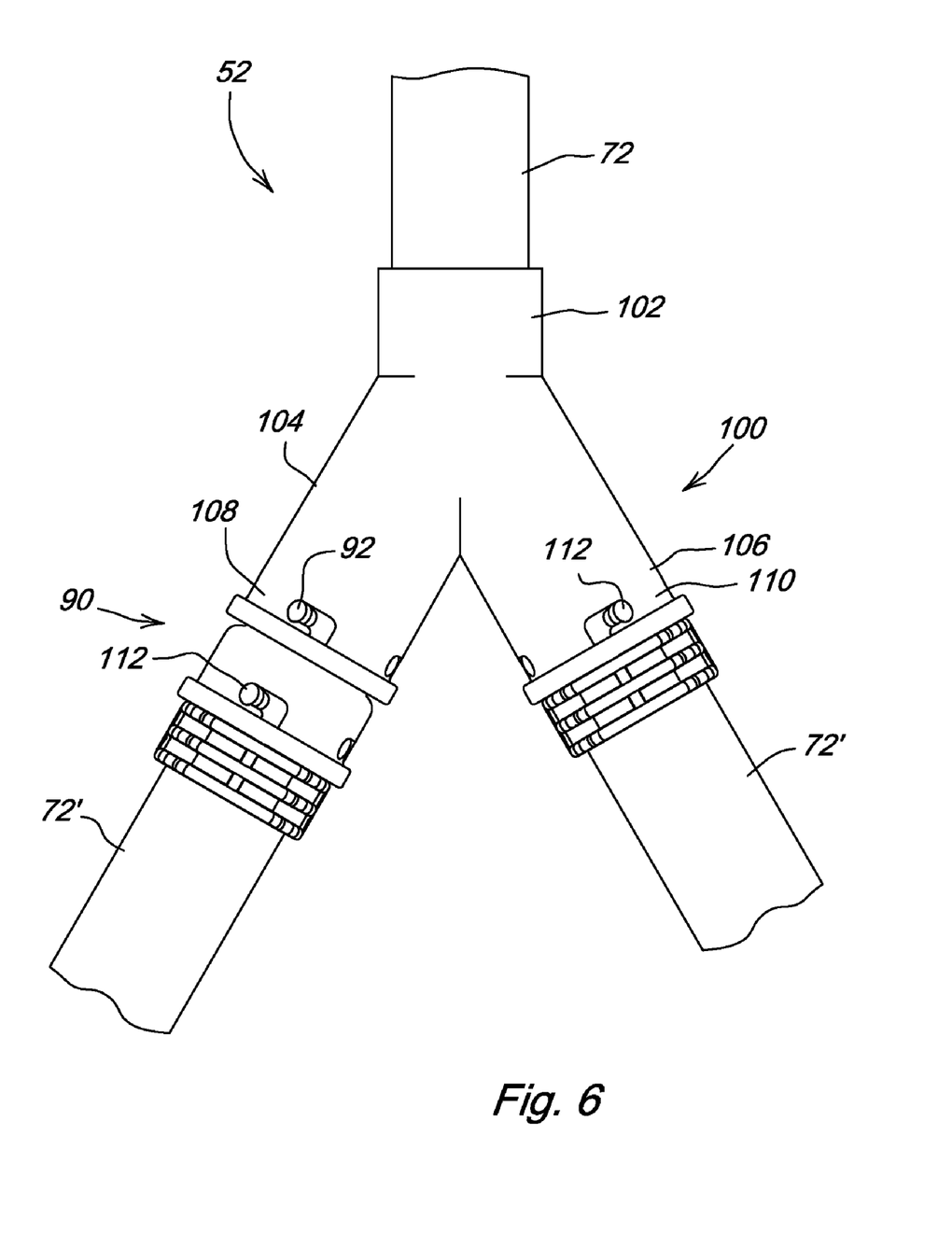
FIG. 6 is a view of a Y-connector with one of the branches of the Y capped to prevent material flow and the remaining branch connected for transferring material.

Further conduit routing flexibility is provided with a Y-connector or multi-connector 100 having a first end 102 connected to one of the conduit sections, such as section 72 as shown in FIG. 6. A plurality of divergent branches 104 and 106 having female bayonet connection ends 108 and 110, respectively, adapted for receiving male bayonet connecting ends 112 of conduit sections 72'. If blocking of one of the branches is necessary for the desired hose routing arrangement, the cap 90 can be connected as shown on the branch 104 in FIG. 6. If a corresponding section 72' is available and unused adjacent the Y-connector 100, that section can be supported and the connecting end 112 sealed by inserting the end into the female end of the cap 90.

Referring to FIGS. 7-10, examples of systems for delivery of material from first and second hoppers 162 and 164 are shown. The hoppers 162 and 164 can contain two different types of material such as, for example, genetically modified seed and refuge seed, or female and male seed corn. Downstream conduit structure 72 is shown extending from the hoppers 162 and 164 towards the distributing units. Upstream conduit structure 172 and 174 (FIGS. 7 and 8) is connected to a source of air and to the first and second hoppers 162 and 164. Valve structure 178 or 178' selects one of the first and second hoppers for delivery of the material to the soil.

Figure 7:
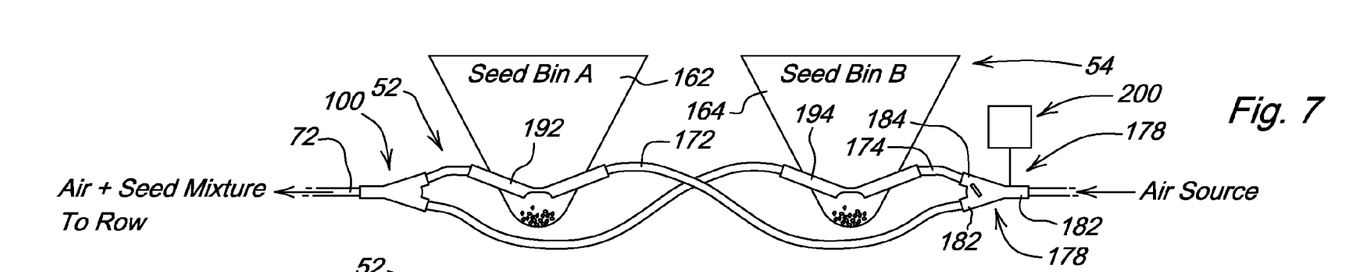
FIG. 7 is a view of a system for selectively delivering one of two materials to a row and including an upstream selection valve system.

As shown in FIG. 7, the valve structure 178 is located upstream of the hoppers and includes an air inlet 180 and air outlets 182 and 184 connected to the conduit section 172 and 174, respectively, which in turn are connected to material pick-up nozzles 192 and 194. The valve structure 178 is switchable to direct air either to the conduit section 172 or 174. When air is directed to the conduit section 172, air supply to the section 174 is cut off, and a venturi effect created at the nozzle 192 causes material from the hopper 162 to be picked up by the nozzle and directed to a Y-connector 100 communicating with the conduit structure 72. Switching the valve 178 causes air to be shut off from the section 172 delivered through the conduit section 174 to the nozzle 194 so that material from the hopper 164 is delivered to the conduit structure 72. A remote or automatic switching control 200 is connected to the valve structure 178 to provide remote operation of the valve. The control 200 can be a map-based switching control to provide automatic operation based on field location and desired material delivery to the soil. The control 200 can, for example, automatically vary seed varieties based on location to improve drought resistance for dry regions of a field, or change seed varieties within the field to improve pest or mold resistance where necessary.

Figure 8:
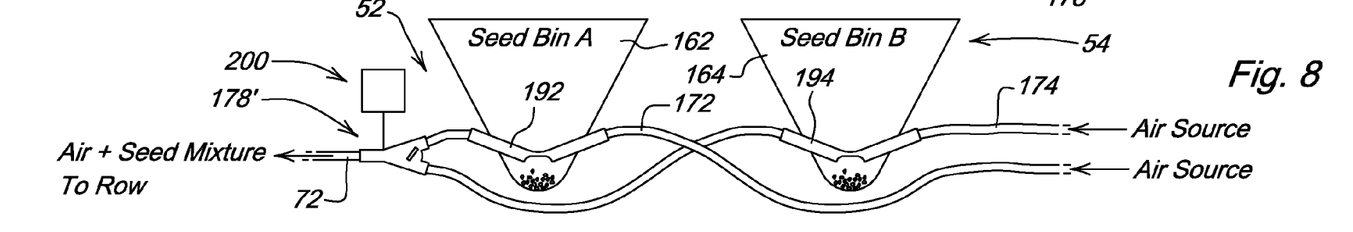
FIG. 8 is a view of a system similar to that of FIG. 7 but showing a downstream selection valve system.

A second embodiment shown in FIG. 8 includes air and seed valve structure 178' connected downstream of the first and second hoppers 162 and 164. Air supply sections 172 and 174 are connected to the inlets of the nozzles 192 and 194. When the valve structure 178' is switched to open the outlet of the nozzle 192 to the conduit structure 72, material is picked up in the hopper 162 and delivered to the row while material from the hopper 164 is blocked. Switching the structure 178' opens the outlet of the nozzle 194 to the conduit structure 72 to pick up material from hopper 164 and blocks material from the hopper 162. The automatic switching control 200 can be connected to the valve structure 178' to provide remote operation of the valve similar to that described above for the valve structure 178.

Figure 9:
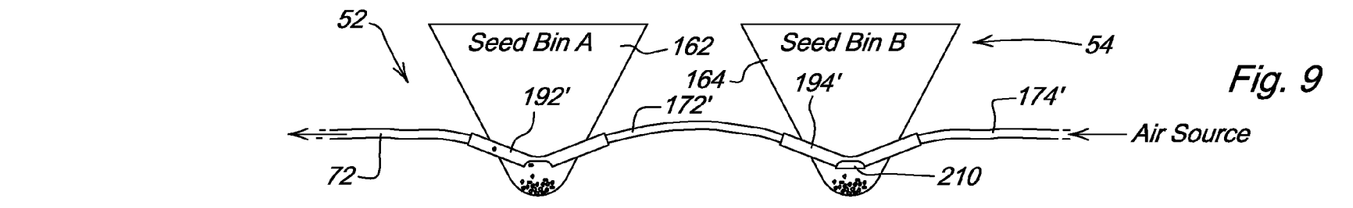
FIG. 9 is a view of a serial delivery system for selectively delivering material from one of two hoppers to a row.
Figure 10:
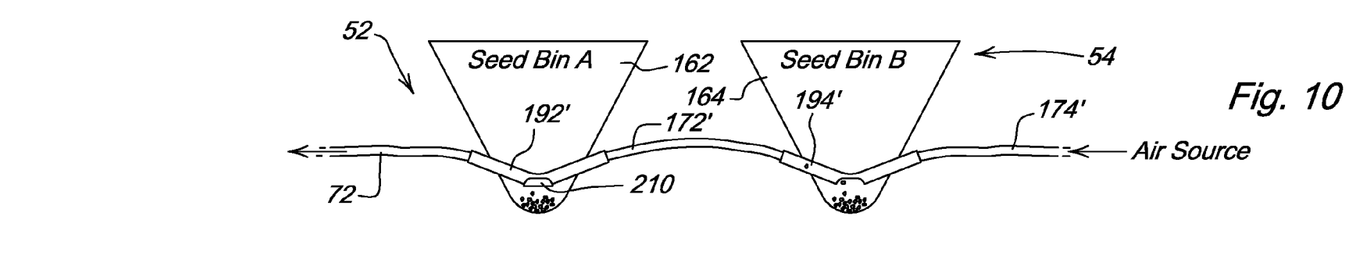
FIG. 10 is a view similar to that of FIG. 9 but showing the system delivering material from the other of the hoppers.

In a further embodiment shown in FIGS. 9 and 10, the valve structure includes selectively blockable and unblockable nozzle structures 192' and 194' located in the first and second hoppers 162 and 164 and connected in series between an air supply section 174' and the delivery conduit structure 72. A snap-on cap 210 can be clipped or unclipped from a selected nozzle structure. The nozzle structures facilitate pickup of material from a hopper when upcapped (see 192' of FIGS. 9 and 194' of FIG. 10) and prevent pickup of material when capped (see 194' of FIGS. 9 and 192' of FIG. 10). The series connection provides simplified hose routing. Automatic capping and uncapping can also be provided through slide or rotating valve structure located in the hopper connected to the control 200 to provide remote selection or to remotely control the selection operation based on a map.

Figure 2:
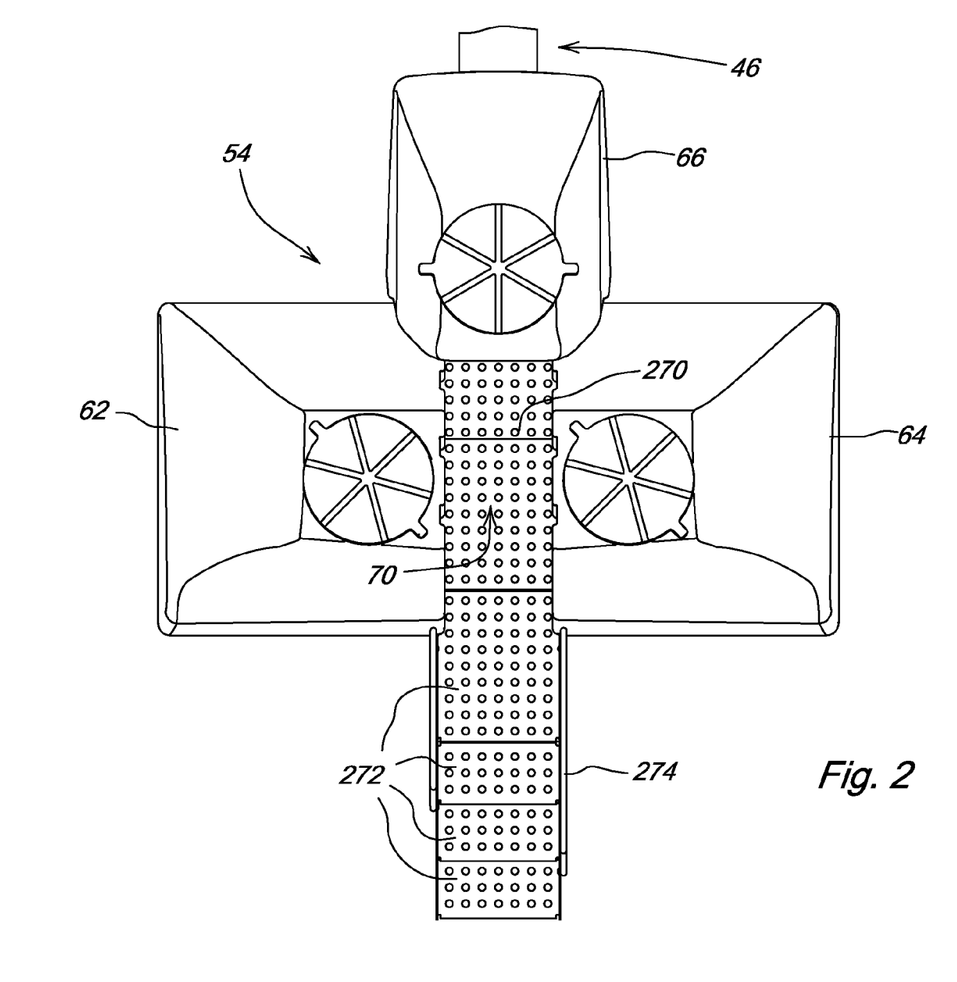
FIG. 2 is a top view of the hopper structure and access structure for the implement of FIG. 1.

The operator access area 70 (FIGS. 1 and 2) includes a platform 270 providing convenient access to the central hopper 66. Often, refuge crop or male seed corn is loaded by hand from bags, and the access area 70 facilitates the loading process. Steps 272 with hand rails 274 extend rearwardly from the platform 270 to the rear of the implement 40.

Figure 11:
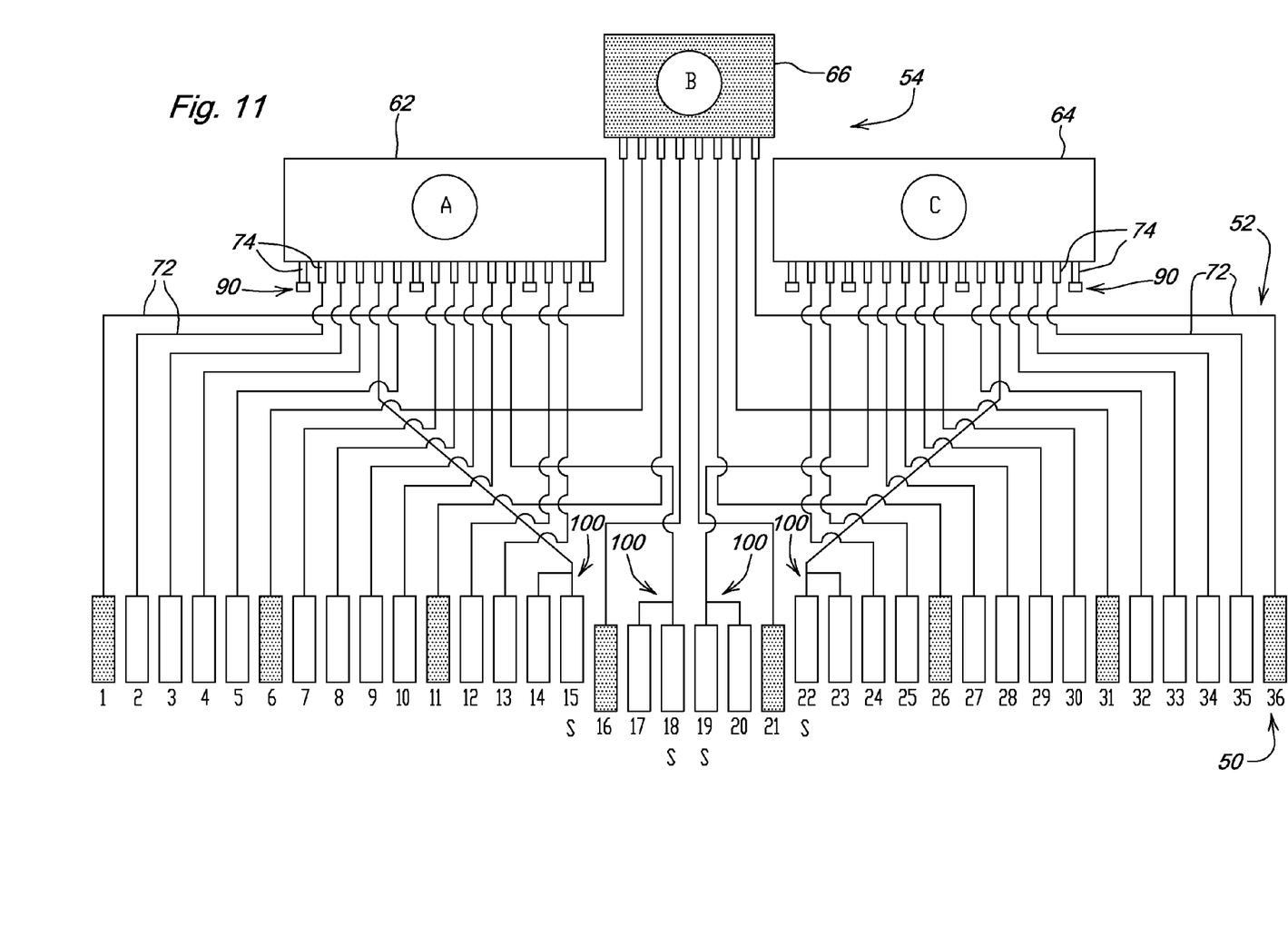
FIG. 11 is a schematic representation of the seeding implement showing seed hopper connections and routing structure for a row configuration wherein material from a central tank is directed to rows spaced across the width of the machine.
Figure 12:
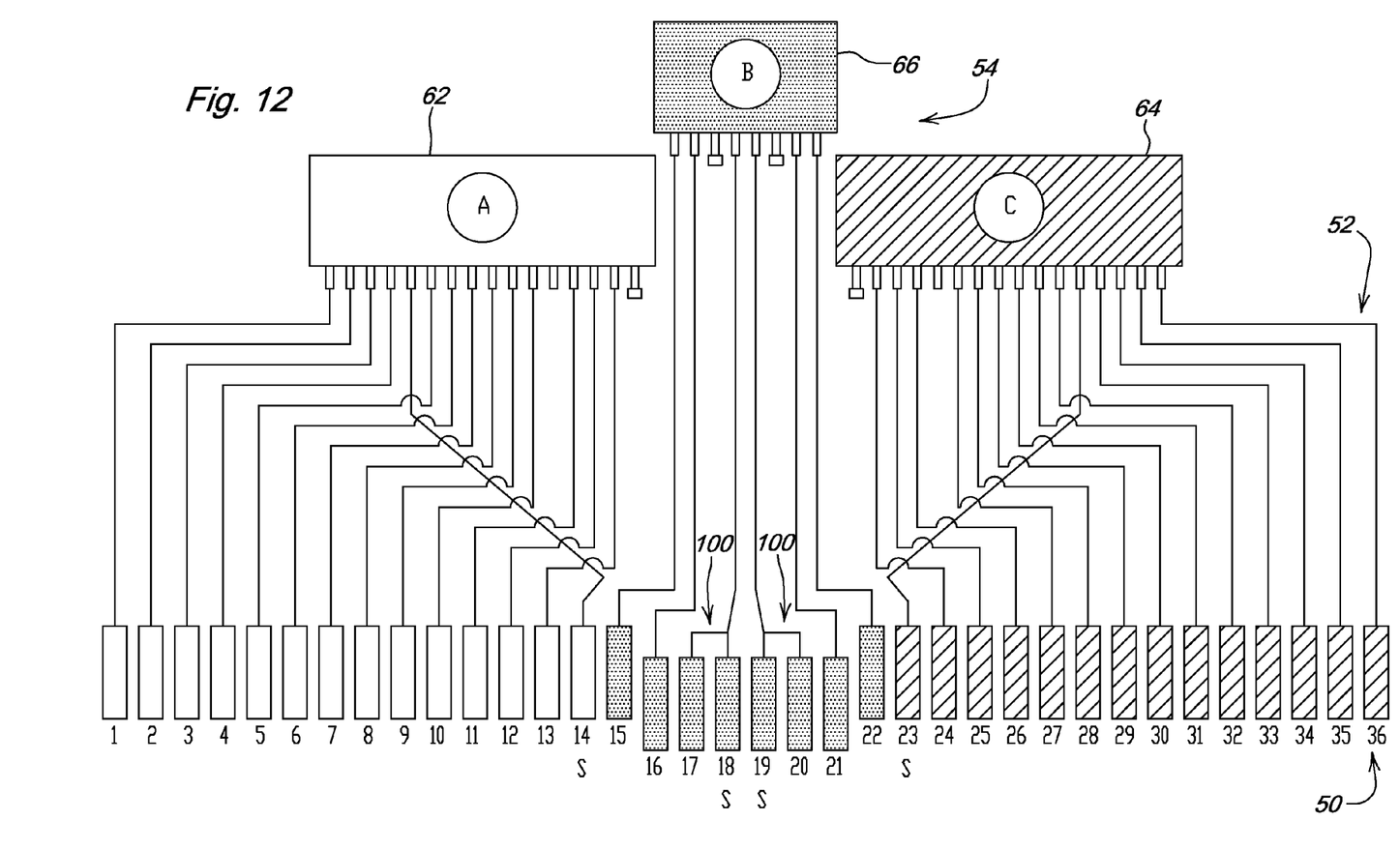
FIG. 12 is a schematic representation similar to that of FIG. 11 but showing a routing structure for banding the material from the central tank.
Figure 13:
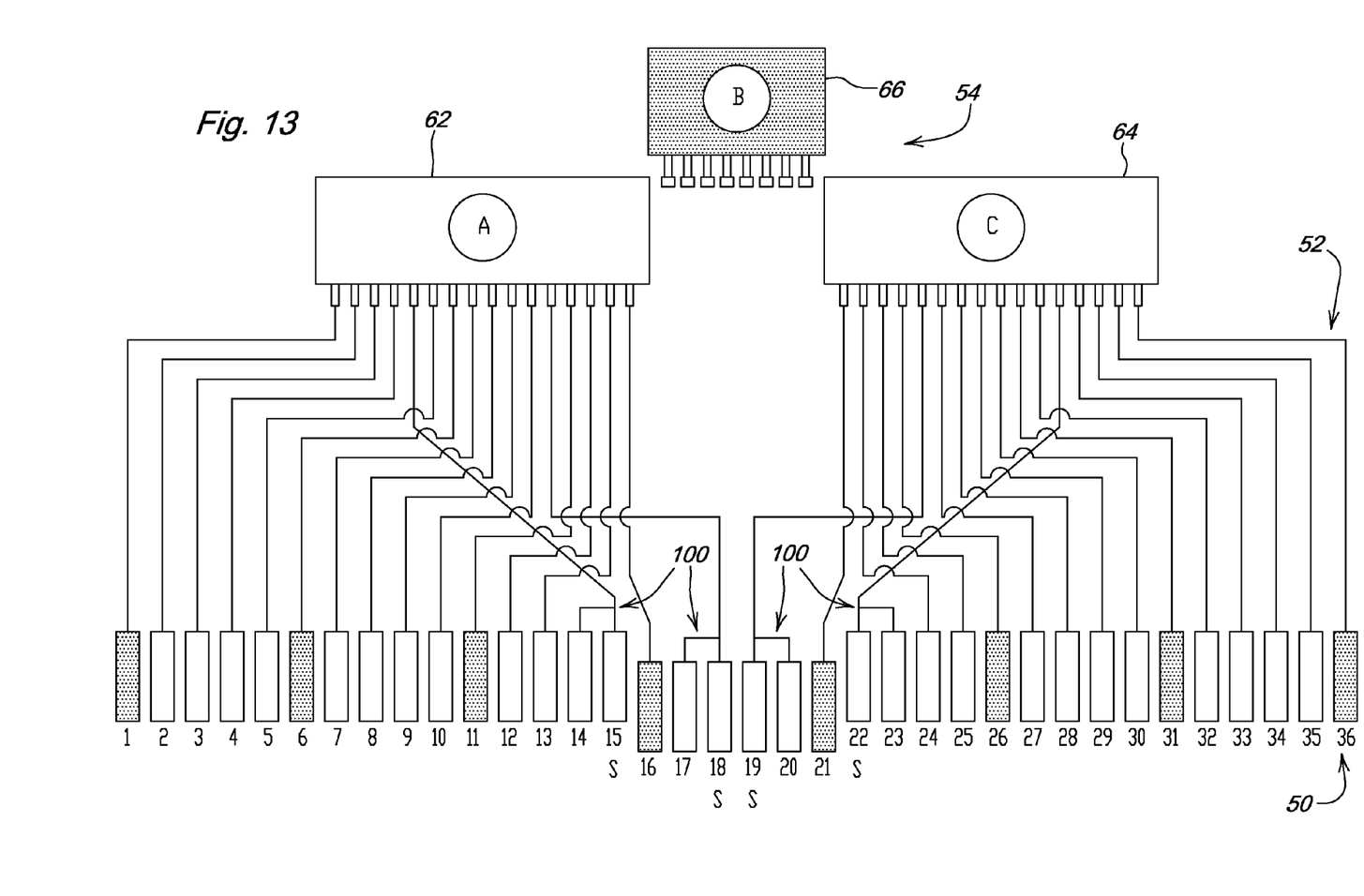
FIG. 13 is a schematic representation of another routing structure wherein one of the hoppers is blocked from delivery of material.

Examples of various row patterns for a 36 row machine utilizing the above-described hopper and routing structure are shown in FIGS. 11-13. FIG. 11 is an example of providing a single row (rows 1, 6, 11, 16, 21, 26, 31 and 36) of material such as refuge seed or male seed corn from the hopper 66 between multiple rows (2-5, 7-10, 12-15, 17-20, 22-25, 27-30, and 32-35) of other seed from the hoppers 62 and 64. FIG. 12 provides an example of banding eight rows of refuge or other seed in central rows 15-22 while providing a different variety of seed from the hopper 62 for rows 1-14, and yet another variety from the hopper 64 for the rows 23-36. An example of a routing arrangement wherein material from the male or refuge seed hopper 66 is not required for an area of the field being planted is shown in FIG. 13. The hopper and conduit structure and remote or automatic map based control utilizing the valve or capping structure and controller 200 described above or a similar automatic arrangement helps optimize hose routing and conveniently provides desired row patterns and selectable hopper and row blocking, on-the-go if desired.

Having described the preferred embodiment, it will become apparent that various modifications can be made without departing from the scope of the invention as defined in the accompanying claims.

The invention claimed is:

1. In an agricultural implement adapted for forward movement over soil and having a transversely extending frame, the frame supporting distributing units for delivering at least one material to the soil, material hopper and routing structure comprising:
   first and second hoppers, each hopper containing material to be delivered to the soil;
   downstream conduit structure connected between the hoppers and extending towards the distributing units;
   upstream conduit structure connected to a source of air and to the first and second hoppers;
   valve structure for selecting one of the first and second hoppers for delivery of the material in the selected hopper through the downstream conduit structure to the soil; and
   wherein the valve structure comprises an air valve located in the upstream conduit structure to direct air to the selected hopper, the valve structure thereby determining from which hopper the material will be delivered to the distributing units and to the soil without passage of the material through the valve structure.

2. The material hopper and routing structure set forth in claim 1 wherein the valve structure comprises an air input connected to the source of air and two outputs connected respectively to the first and second hoppers.

3. The material hopper and routing structure set forth in claim 1 wherein the valve structure comprises an air and seed valve connected downstream of the first and second hoppers.

4. The material hopper and routing structure set forth in claim 1 wherein the valve structure comprises a remotely operable valve.

5. The material hopper and routing structure set forth in claim 4 wherein the remotely operable valve comprises a map-based switching valve for automatically changing material flow in accordance with a map.

6. In an agricultural implement adapted for forward movement over soil and having a transversely extending frame, the frame supporting distributing units for delivering at least one material to the soil, material hopper and routing structure comprising:

first and second hoppers, each hopper containing material to be delivered to the soil;

downstream conduit structure connected between the hoppers and extending towards the distributing units;

upstream conduit structure connected to a source of air and to the first and second hoppers;

valve structure for selecting one of the first and second hoppers for delivery of the material in the selected hopper through the downstream conduit structure to the soil; and including a hopper conduit structure extending into the first and second hoppers, wherein the valve structure includes selectively blockable and unblockable air nozzle structure located in the first and second hoppers, the air nozzle structure facilitating pickup of material from the hoppers when unblocked and preventing pickup of material when blocked.

7. The material hopper and routing structure set forth in claim 6 wherein the air nozzle structure comprises a first air nozzle in the first hopper and a second air nozzle structure in the second hopper and wherein the hopper conduit structure connects the first air nozzle in series with the second air nozzle.

8. The material hopper and routing structure set forth in claim 6 including a cap selectively attachable to and detachable from the air nozzle structure.

* * * * *